(12) United States Patent
Choi

(10) Patent No.: US 8,134,259 B2
(45) Date of Patent: Mar. 13, 2012

(54) LINEAR VIBRATOR

(75) Inventor: Jun Kun Choi, Gyunggi-do (KR)

(73) Assignee: Samsung Electro-Mechanics Co., Ltd., Gyunggi (KR)

( * ) Notice: Subject to any disclaimer, the term of this patent is extended or adjusted under 35 U.S.C. 154(b) by 208 days.

(21) Appl. No.: 12/703,149

(22) Filed: Feb. 9, 2010

(65) Prior Publication Data

US 2011/0133578 A1    Jun. 9, 2011

(30) Foreign Application Priority Data

Dec. 3, 2009  (KR) .................. 10-2009-0119244

(51) Int. Cl.
*H02K 33/00* (2006.01)

(52) U.S. Cl. .......................................... 310/25; 310/15

(58) Field of Classification Search .................... 310/25, 310/15, 36
See application file for complete search history.

(56) References Cited

U.S. PATENT DOCUMENTS

| 5,956,622 | A  | * | 9/1999  | Lee ................................ 340/7.6 |
| 7,038,335 | B2 | * | 5/2006  | Choi et al. .................. 310/12.24 |
| 7,576,462 | B2 | * | 8/2009  | Miura ............................. 310/89 |
| 7,619,498 | B2 | * | 11/2009 | Miura ........................... 335/222 |

FOREIGN PATENT DOCUMENTS

KR    1020080107506    12/2008

* cited by examiner

*Primary Examiner* — Nguyen N Hanh
(74) *Attorney, Agent, or Firm* — Blakely Sokoloff Taylor & Zafman LLP

(57) ABSTRACT

Disclosed herein is a linear vibrator. The linear vibrator includes a stationary unit which has on an upper portion thereof a magnet generating a predetermined magnetic force and a yoke, and defines an internal space. A vibratory unit includes a coil mounted to face the magnet and applying an electric current, and a mass body. A spring is secured at a lower end thereof to the stationary unit and secured at an upper end thereof to the vibratory unit, thus elastically supporting the linear motion of the vibratory unit. A lubricating part is provided between an outer circumference of each of the magnet and the yoke and the coil, thus preventing noise and abrasion when the vibratory unit moves linearly, in addition to maintaining a vibration.

8 Claims, 2 Drawing Sheets

LINEAR VIBRATOR

CROSS REFERENCE TO RELATED APPLICATION

This application claims the benefit of Korean Patent Application No. 10-2009-0119244, filed on Dec. 3, 2009, entitled "LINEAR VIBRATOR", which is hereby incorporated by reference in its entirety into this application.

BACKGROUND OF THE INVENTION

1. Technical Field

The present invention relates to a linear vibrator.

2. Description of the Related Art

The most important feature of an electronic device, such as a mobile phone, is the generation of vibration. A vibration motor is a means for generating vibration and is constructed so that its axis is eccentric or the center of gravity is non-uniformly distributed to one side and thereby the motor generates vibrations as it rotates.

However, the vibration motor is problematic in that a brush passes through a gap between segments when the motor rotates, so that friction and sparks are generated, and thus the lifespan of the motor is reduced. In addition to the problem, the vibration motor has other problems as well.

In order to overcome the drawbacks of the vibration motor, a linear vibrator has been developed. In the linear vibrator, a vibratory unit mounted to a spring vibrates while performing rectilinear motion in a vertical or horizontal direction as a result of an electromagnetic force between a magnet and a coil, so that friction and abrasion do not occur unlike in the vibration motor, and thus the lifespan of the linear vibrator is long. Further, the miniaturization of the linear vibrator is possible. Accordingly, a variety of types of linear vibrators are currently in development.

The conventional linear vibrator is constructed so that mechanical vibrations are generated by rotating a rotor having an eccentric mass body, and a rotating force is commutated through a contact point between the brush and a commutator, thus supplying electric current to the coil of the rotor.

However, the conventional linear vibrator is problematic in that mechanical friction and abrasion and electric sparks are generated while the brush is passing through a gap between a segment of the commutator and another segment, so that impurities such as black powder are generated, and thus the lifespan of the linear vibrator is short.

Therefore, research into a linear vibrator which can generate more stable linear vibration and stop vibrating rapidly and stably is urgent.

SUMMARY OF THE INVENTION

The present invention has been made in an effort to provide a linear vibrator, which can more stably vibrate linearly and rapidly and stably stop vibrating.

In a linear vibrator according to an embodiment of the present invention, a stationary unit has on an upper portion thereof a magnet generating a predetermined magnetic force and a yoke, and defines an internal space. A vibratory unit includes a coil mounted to face the magnet and applying an electric current, and a mass body. A spring is secured at a lower end thereof to the stationary unit and secured at an upper end thereof to the vibratory unit, thus elastically supporting the linear motion of the vibratory unit. A lubricating part is provided between an outer circumference of each of the magnet and the yoke and the coil, thus preventing noise and abrasion when the vibratory unit moves linearly, in addition to maintaining a vibration.

The stationary unit may further include a damper which is provided on the upper portion of the stationary unit and is made of an elastic material to prevent the vibratory unit from being in contact with the stationary unit when the vibratory unit moves linearly.

The lubricating part may be a magnetic fluid band which is formed on the outer circumference of the magnet by applying magnetic fluid focused to correspond to a magnetic flux of the magnet.

Further, a portion of the lubricating part may be in contact with the inner portion of the coil.

In a linear vibrator according to another embodiment of the present invention, a stationary unit includes a casing which has on an upper portion thereof a magnet generating a predetermined magnetic force and a yoke, and defines an internal space. A bracket is mounted to the lower portion of the casing to seal an internal space thereof. A vibratory unit includes a coil mounted to face the magnet and applying current, a holder coupled to an outer circumference of the coil, and a mass body provided on an outer circumference of the holder. A spring is secured at a lower end thereof to the stationary unit and secured at an upper end thereof to the vibratory unit, thus elastically supporting a linear motion of the vibratory unit. A lubricating part is provided between an outer circumference of each of the magnet and the yoke and the coil, thus preventing noise and abrasion when the vibratory unit moves linearly, in addition to maintaining a vibration.

The stationary unit may further include a damper which is provided on the upper portion of the stationary unit and prevents the vibratory unit from being in contact with the stationary unit when the vibratory unit moves linearly.

The lubricating part may be a magnetic fluid band which is formed on the outer circumference of the magnet by applying magnetic fluid focused to correspond to a magnetic flux of the magnet.

Further, a portion of the lubricating part may be in contact with an inner portion of the coil.

As is apparent from the above description, a linear vibrator according to the present invention provides an advantage in that it has a damper and a lubricating part, thus minimizing abrasion or noise attributable to the excessive vibration of a vibratory unit, therefore preventing the lateral vibration of the vibratory unit and realizing stable linear vibration.

Further, the linear vibrator according to the present invention provides another advantage in that the damper and the lubricating part perform a damping operation, thus reducing a period for which vibratory unit stops vibrating, therefore reducing the residual vibration of a spring.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
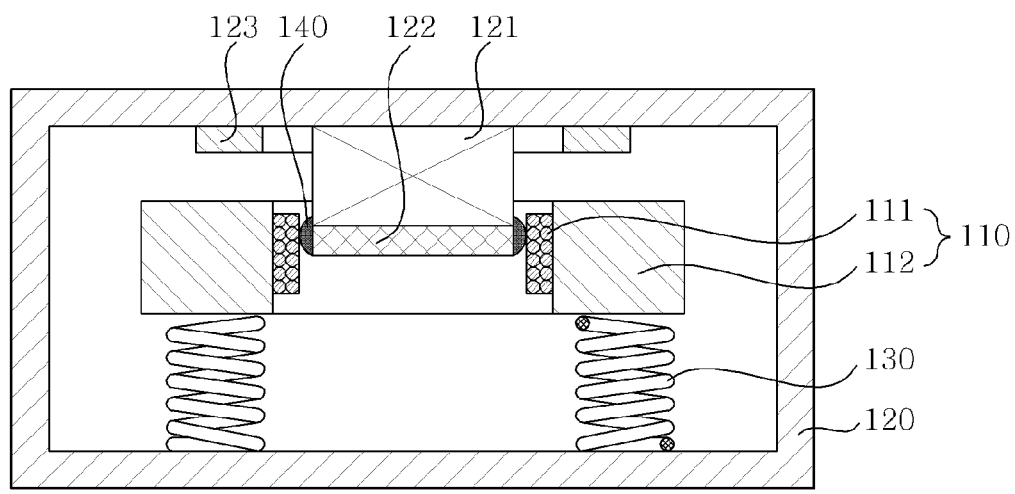
FIG. 1 is a sectional view illustrating a linear vibrator according to a first embodiment of the present invention.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. Herein, the same reference numerals are used throughout the different drawings to designate the same components. Further, when it is determined that the detailed description of the known art related to the present invention may obscure the gist of the present invention, the detailed description will be omitted.

Hereinafter, linear vibrators according to the preferred embodiments of the present invention will be described in detail with reference to the accompanying drawings.

Figure 2:
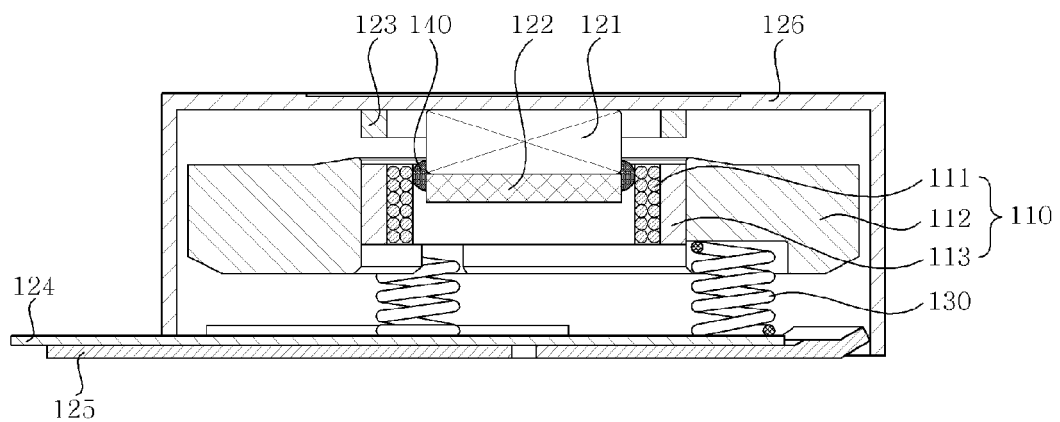
FIG. 2 is a sectional view illustrating a linear vibrator according to a second embodiment of the present invention.
Figure 3:
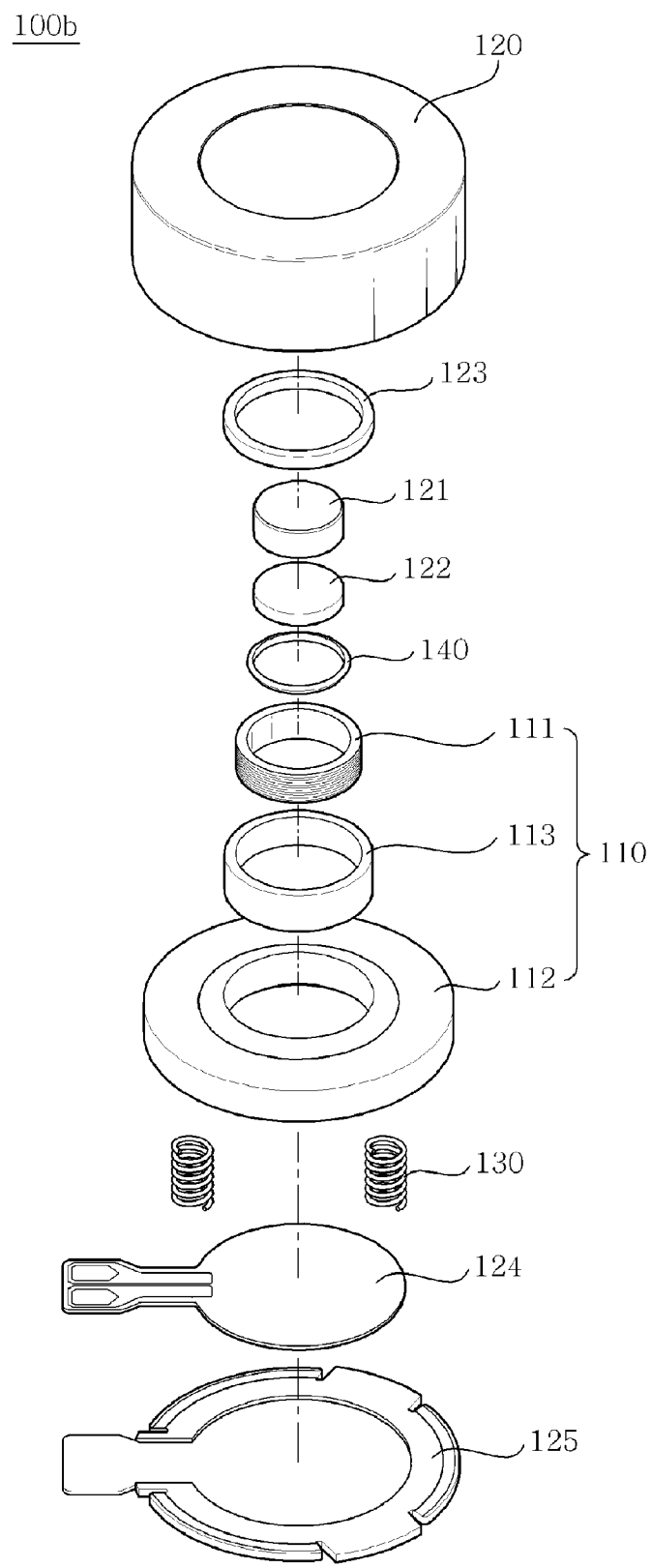
FIG. 3 is an exploded perspective view illustrating the linear vibrator according to the second embodiment of the present invention.

As shown in FIGS. 1 to 3, a linear vibrator 100a according to the present invention includes a vibratory unit 110, a stationary unit 120, springs 130, and a lubricating part 140.

The vibratory unit 110 includes a coil 111 which applies electric current to induce a magnetic field, and a mass body 112 which is provided on the outer circumference of the coil 111 and has a mass.

When an electric current of a predetermined frequency is applied to the coil 111, a magnetic field may be induced around the coil 111.

The mass body 112 interacts with a magnet 121 in response to the power signal of the coil 111, thus generating vibrations in a vertical direction.

Preferably, the mass body 112 has a specific gravity which is heavier than iron (Fe). This increases the mass of the vibratory unit 110 for the same volume, thus adjusting a resonance frequency related to the mass of the vibration unit 110, and maximizing vibrational strength.

The mass body 112 is enlarged laterally to have a larger mass. Such a construction also increases mass for a given volume, thus maximizing vibrational strength.

Generally, in the linear vibrator using resonance frequency F, as shown in the following [Equation 1], the resonance frequency F is determined by the mass m of the mass body 112 and the spring constant k of the springs 130. When power having the resonance frequency F is applied to the coil 111 and electric current flows in the coil 111, the vertical displacement and vibration of the mass body 112 assume maximum values.

$$F = \frac{1}{2\pi}\sqrt{\frac{k}{m}}$$ [Equation 1]

In order to correct the natural frequency of the linear vibrator 100a, the vibratory unit 110 is provided with at least one hole (not shown) to add to or subtract from the mass of the vibratory unit 110.

The stationary unit 120 has on an upper surface thereof the magnet 121 which is opposite to the coil 111. The springs 130 are mounted to the lower surface of the stationary unit 120 to elastically support the mass body 112. Further, the yoke 122 is provided under the magnet 121, and the lubricating part 140 is provided between an outer circumference of the yoke 122 and the coil 111 to guide the linear motion of the vibratory unit 110.

The magnet 121 is placed such that a surface thereof faces the coil 111, and part of the magnet 121 having the surface is inserted into a space defined by the coil 111.

The magnetic flux of the magnet 121 and the electromagnetic induction of the coil 111 cause the vibratory unit 110 to vibrate linearly.

That is, interaction between the springs 130 which elastically support the vibratory unit 110, the magnet 121 and the coil 111 causes the vibratory unit 110 to vibrate linearly. The yoke 122 is provided under the magnet 121 to uniformly induce the intensity of the magnetic field.

The lubricating part 140 is provided between the yoke 122 and the magnet 121 and the coil 111, thus preventing the vibratory unit 110 from vibrating rightwards and leftwards by external shock, and allowing the vibratory unit 110 to vibrate linearly, in addition to preventing residual vibration.

The lubricating part 140 may use magnetic fluid and has a property which focuses the magnetic flux of the magnet 121. When the lubricating part 140 is applied to a surface of the magnet 121, the lubricating part 140 is focused on a spot where the magnetic flux of the magnet 121 is generated, thus forming one ring.

The magnetic fluid is produced by stably dispersing magnetic powder in liquid in a colloid form, and adding a surfactant to prevent the magnetic powder from becoming deposited or cohering under the influence of gravity or the magnetic field. For example, the magnetic fluid is produced by dispersing $Fe_3O_4$ or an iron-cobalt alloy particle in oil or water. Further, recently, magnetic fluid produced by dispersing cobalt in toluene has been proposed.

The magnetic powder is ultrafine particle powder of 0.01 to 0.02 μm, performs Brownian movement of ultrafine particles and keeps the concentration of the magnetic powder in the fluid uniform even if an external magnetic field, gravity, and centrifugal force act on the magnetic powder.

Further, the lubricating part 140 fills a gap between the outer surface of the magnet 121 and the inner surface of the hollow portion of the coil 111, thus allowing the vibratory unit 110 to vibrate or slide smoothly.

That is, the lubricating part 140 is in contact with only one surface of the coil 111.

Further, the lubricating part 140 may include a magnetic fluid band which is formed along the outer circumference of the magnet 121 by the magnetic flux of the magnet 121. Such a magnetic fluid band may be formed on the outer circumference of the magnet 121 by applying the magnetic fluid which is focused to correspond to the magnetic flux of the magnet 121.

That is, a predetermined gap is formed between the outer surface of the magnet 121 and the inner surface of the hollow portion, and the magnetic fluid band is formed in the gap along the outer circumference of the magnet 121 by the magnetic flux of the magnet 121.

As such, the lubricating part 140 supports linear vibration, and prevents a touch sound from being generated when the vibratory unit 110 impacts the stationary unit 120 because of the excessive vibration of the vibratory unit 120, in addition to preventing the lateral vibration of the vibratory unit 110.

Here, the vibratory unit 110 and the stationary unit 120 are relative concepts. The stationary unit 120 is a part which is fixed to the vibratory unit 110 generating vibration, and the vibratory unit 110 is a part which vibrates relative to the stationary unit 120.

The principle of linear vibration is as follows. The springs 130 elastically support the vibratory unit 110 including the coil 111. When the coil 111 and the springs 130 are connected to each other and current is applied, an electromagnetic force acts on the coil 111 which may induce the magnetic field, thus causing the linear vibration of the vibratory unit 110. In this case, the coil 111 is placed in the magnetic field of the magnet 121.

When the electromagnetic force acts on the coil 111, the magnetic flux passing from the magnet 121 to the coil 111 is formed horizontally. The magnetic field generated by the coil 111 is formed vertically, thus vibrating the vibratory unit 110 vertically. Thus, the direction of the magnetic flux of the magnet 121 is perpendicular to the vibrating direction of the vibratory unit 110.

When the electromagnetic force acts in conformation with the natural frequency of the vibratory unit 110, it performs resonance, thus obtaining maximum vibratory strength. The natural frequency of the vibratory unit 110 is affected by the mass m of the vibratory unit 110 and the spring constant k of the springs 130 as shown in [Equation 1].

Meanwhile, the damper 123 is placed on the upper portion or lower portion of the stationary unit 120 to face the vibratory unit 110 and the stationary unit 120, thus absorbing the vibration of the vibratory unit 110. Thus, in the case where the vibratory unit 110 vibrates linearly, the damper 123 prevents the vibratory unit 110 from coming into contact with the stationary unit 120 because of the excessive vibration of the vibratory unit 110, thus preventing touch noise from being generated, in addition to preventing abrasion.

The damper 123 may also be placed on a surface of the stationary unit 120 facing the other surface of the mass body 112. For example, when the vibratory unit 110 vibrates vertically, the damper 123 may be mounted to the lower portion of the stationary unit 120 or be provided on the upper portion of the stationary unit 120, thus preventing touch sound from being generated due to the vertical vibration of the vibratory unit 110.

The damper 123 may be made of various materials for absorbing the shock of the vibratory unit 110, for example, rubber, cork, and polypropylene.

FIGS. 2 and 3 are a sectional view and an exploded perspective view, respectively, illustrating a linear vibrator according to a second embodiment of the present invention. Hereinafter, the linear vibrator 100b according to this embodiment will be described with reference to the drawings. Since the basic construction of the second embodiment remains the same as the first embodiment except for some components, the same reference numerals are used throughout the different drawings to designate the same or similar components, and a duplicate description will be omitted.

The linear vibrator 100b according to the second embodiment of the present invention includes a damper 123, a flexible printed circuit board (FPC) 124, a bracket 125, a casing 126, springs 130, and a lubricating part 140.

A holder 113 is provided on the outer circumference of a coil 111 to hold the coil 111, and a mass body 112 is provided on the outer circumference of the holder 113.

Since the mass body 112 has been described in detail with reference to the first embodiment, it will not be described for the second embodiment.

One end of each spring 130 is secured to the FPC 124, while the other end is secured to the vibratory unit 110, so that the spring 130 elastically supports the vibratory unit 110 to linearly vibrate it.

The spring constant of the springs 130 affects the natural frequency of the vibratory unit 110.

Each spring 130 has the form of a coil spring or plate spring, is secured to the bottom in the casing 126 and is connected to the vibratory unit 110, thus generating elastic force.

The FPC 124, which has an electronic part or electronic circuit formed thereon and is made of a flexible material, is provided under the springs 130, thus connecting the flow of electricity.

The bracket 125 is provided under the FPC 124 to support the parts at a lower position.

The bracket 125 is made of a non-magnetic or weakly magnetic substance so as not to affect a drive unit The casing 126 is a receiving member having an internal space of a predetermined size, and the bottom of the casing 126 which is open downwards is closed by the bracket 125.

The magnet 121 is magnetized such that upper and lower portions thereof have different poles in a vertical direction in the drawing, thus generating the magnetic force of a predetermined intensity.

The damper 123 is mounted to a predetermined portion of the casing 126 so as to prevent touch sound and abrasion caused by the excessive vibration of the vibratory unit 110, and the lubricating part 140 fills a gap between the outer surfaces of the magnet 121 and the yoke 122 and the inner surface of the coil 111, thus allowing the vibratory unit 110 to vibrate or slide smoothly.

Since the damper 123 and the lubricating part 140 have been described in detail in the first embodiment, they will not be described in the second embodiment.

As described above, the linear vibrator 100a or 100b according to the present invention is provided with the damper 123 and the lubricating part 140, thus minimizing abrasion or noise attributable to the excessive vibration of the vibratory unit 110, therefore preventing the lateral vibration of the vibratory unit 110 and realizing stable linear vibration.

Further, the damper 123 and the lubricating part 140 perform the damping operation, thus reducing a period for which vibratory unit 110 stops vibrating, therefore reducing the residual vibration of the springs 130.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A linear vibrator, comprising:
   a stationary unit having on an upper portion thereof a magnet generating a predetermined magnetic force and a yoke, and defining an internal space;
   a vibratory unit including a coil mounted to face the magnet and applying an electric current, and a mass body;
   a spring secured at a lower end thereof to the stationary unit and secured at an upper end thereof to the vibratory unit, thus elastically supporting a linear motion of the vibratory unit; and
   a lubricating part provided between an outer circumference of the yoke and the coil, thus preventing noise and abrasion when the vibratory unit moves linearly, in addition to maintaining a vibration.

2. The linear vibrator as set forth in claim 1, wherein the stationary unit further comprises a damper which is provided on the upper portion or lower portion of the stationary unit and is made of an elastic material to prevent the vibratory unit from being in contact with the stationary unit when the vibratory unit moves linearly.

3. The linear vibrator as set forth in claim 1, wherein the lubricating part comprises a magnetic fluid band which is formed on the outer circumference of the magnet by applying magnetic fluid focused to correspond to a magnetic flux of the magnet.

4. The linear vibrator as set forth in claim 1, wherein a portion of the lubricating part is in contact with an inner portion of the coil.

5. A linear vibrator, comprising:
- a stationary unit including:
  - a casing having on an upper portion thereof a magnet generating a predetermined magnetic force and a yoke, and defining an internal space; and
  - a bracket mounted to a lower portion of the casing to seal an internal space thereof,
- a vibratory unit including:
  - a coil mounted to face the magnet and applying current;
  - a holder coupled to an outer circumference of the coil; and
  - a mass body provided on an outer circumference of the holder;
- a spring secured at a lower end thereof to the stationary unit and secured at an upper end thereof to the vibratory unit, thus elastically supporting a linear motion of the vibratory unit; and
- a lubricating part provided between an outer circumference of each of the magnet and the yoke and the coil, thus preventing noise and abrasion when the vibratory unit moves linearly, in addition to maintaining a vibration.

6. The linear vibrator as set forth in claim 5, wherein the stationary unit further comprises a damper which is provided on the upper portion or lower portion of the stationary unit and prevents the vibratory unit from being in contact with the stationary unit when the vibratory unit moves linearly.

7. The linear vibrator as set forth in claim 5, wherein the lubricating part comprises a magnetic fluid band which is formed on the outer circumference of the magnet by applying magnetic fluid focused to correspond to a magnetic flux of the magnet.

8. The linear vibrator as set forth in claim 5, wherein a portion of the lubricating part is in contact with an inner portion of the coil.

* * * * *